HIGH VOLTAGE POWER SUPPLY CASING HAVING AN EPOXY RESIN MOLDED BASE

Filed Jan. 15, 1962

INVENTOR.
ALBERT AJAR
BY
Percy Freeman
ATTORNEY.

April 5, 1966 A. AJAR 3,244,913

HIGH VOLTAGE POWER SUPPLY CASING HAVING AN EPOXY RESIN MOLDED BASE

Filed Jan. 15, 1962 2 Sheets-Sheet 2

INVENTOR.
ALBERT AJAR

BY

ATTORNEY.

United States Patent Office 3,244,913

Patented Apr. 5, 1966

3,244,913

HIGH VOLTAGE POWER SUPPLY CASING HAVING AN EPOXY RESIN MOLDED BASE

Albert Ajar, 86—21 Kingston Place, Jamaica 32, N.Y.

Filed Jan. 15, 1962, Ser. No. 166,250
8 Claims. (Cl. 307—150)

This invention relates to high voltage power supplies, and more particularly to novel casings and enclosures for high voltage power supplies.

In closed circuit television projection ssytems, it is necessary to provide a high voltage power of approximately 40 kilovolts at approximately 300 microamperes to a second anode of a projection tube to produce the brilliance necessary to project a picture to a screen having a width of approximately 15 to 20 feet. In addition, it is necessary to provide another high voltage or focus voltage to the first anode of the projection tube for focusing purposes, and generally a focus voltage of 7.5 kilovolts at 100 microamperes is required.

It will be evident that the larger the screen size, width and length, the larger the audience which can be accommodated with the closed circuit television projection system.

Heretofore, the closed circuit television projection systems have been large and cumbersome and are not readily portable by a single person or operator. Moreover, as a consequence of the large number of component parts and circuit requirements, it was not possible to provide a portable type of closed circuit television projector.

Present day high voltage power supplies which are capable of supplying 38 to 40 kv. are generally of two types. One type is a high voltage A.C. power supply or transformer type, and the other is a high voltage RF power supply. Generally, the A.C. power supply is of the transformer type, which is sealed in oil, and while usable, it is difficult to build and cannot be repaired readily in the field, but usually must be returned to the manufacturer for servicing or replacement.

Very few projector units employ the transformer-type power supply which, together with its associated selenium rectifiers, is known as the "brute force" power supply; it is estimated that only a small percentage of projectors use this type of power supply. The manufacturer generally recommends that this be returned to him for repair. The RF power supply is a high voltage oscillator power supply with feedback incorporated and requires a large number of tubes. The RF power supply, while it is generally used, contains a large number of tubes and component elements, is also difficult to repair in the field and resutls in a unit which is large and cumbersome. An example of one RF power supply used at present contains thirteen tubes plus two relays together with its associated circuit elements.

With the present day voltage doubler, tripler and quadrupler circiuts, it has not been possible to obtain an adequate 40 kv. output with a compact supply. One voltage quadrupler circiut known as a flyback power supply used to quadruple the voltage obtainable from a single tube rectifier is only capable of delivering 28 kv. output.

With present day kick or flyback suppliers, a positive pulse is formed in the plate circuit of the horizontal sweep output tube during the retrace or flyback period of the horizontal sweep cycle. By means of autotransformer action, this pulse is stepped up to approximately 7 kv. This 7 kv. pulse is then quadrupled to 28 kv. for application to the second anode. The filaments of the rectifier tubes which are of the 1B3 type are supplied by a single twin separate windings wound on the sweep output autotransformer. This type of supply is used whenever magnetic beam deflection is incorporated in the normal picture viewing-type of tube.

Present day power supplies of all types are made large and cumbersome because of the requirement to avoid corona, arcing, poor regulation, lack of focus control or regulation, and unwieldy maintenance problems.

It is, therefore, an object of this invention to provide a power supply capable of supplying 40 kv. and yet being of reduced size and with a minmium number of parts and component elements.

Another object of the invention is to provide a power supply casing capable of enclosing a voltage trippler circuit and yet provide the required insulation to prevent arcing between component elements.

Yet another object of the invention is the provision of a portable power supply which is free of arcing during high humidity conditions and which can be easily serviced without the use of a soldering iron or special tools and equipment.

According to the invention, I provide a power supply in which the casing is formed of a synthetic resin and silicone rubber. The synthetic resin is used to form a molded base and the silicone rubber is used for the molded parts. The molded base includes as part of the mold three octal sockets each adapted for the reception of a high voltage rectifier tube. All external connections to the molded base are made through pin jacks which are embedded inside the molded base.

The electrical circuit of the power supply according to the invention, includes three rectifier tubes and two regulator tubes. With a suitable flyback transformer to supply a large voltage pulse to the rectifier tubes, the required 40 kv. output at 300 microamperes and the focus voltage of 7.5 kv. at 100 microamperes is obtained.

With present day power supplies, where a 1B3 tube is used as the rectifier tube, filament voltage for the rectifier tube is obtained by a single turn inductively coupled to the sweep transformer. The electrical circuit according to the invention provides for a separate 60 cycle step-down transformer insulated for 50 kv. to supply the filament voltage for the high voltage rectifier 1B3 tube. The transformer is encapsulated into the synthetic resin base. As a result of the use of the separate transformer, better regulation is obtained since the use of the single turn inductively coupled to the sweep transformer would result in too great an absorption of energy from the system to produce the required 40 kv. at 300 microamperes.

Present day projectors vary in weight between 275–400 pounds and have outer dimensions for example 68" high, 22" wide and 18" deep. This is to be contrasted with a projector using the power supply of the present invention which weighs approximately 60 pounds and is 15" high, 12" wide and 22" deep. This savings in material and reduction in size is achieved by means of the power supply according to the invention. It is understood that further reduction or miniaturization may be accomplished with the use of transistors both in the power supply according to this invention and present day power supplies.

A feature of the casing for the power supply according to the invention is that it can be operated in any position. Further, the construction and layout of the molded base is completely solid. Tubes, condensers and resistors are easily replaced by plugging them into the molded base. A separate sweep protection chassis is eliminated since the power supply according to the invention does not require it, as the sweeps become inoperative the high voltage ceases. The reason for this is that the high voltage is taken from the sweep deflection circuit. It is known that whenever magnetic beam deflection of the picture tube is incorporated, the high voltage may be readily obtained by the addition of a few components in the horizontal deflection output circuit. This supply is used to a large extent in present day television receivers. The rectifier plate voltage is derived from the horizontal deflection circuit, the flyback or retrace portion of the sweep. An additional winding by means of autotransformer action steps up the voltage to approximately 27,000 volts peak to peak, which is then applied to the plate of the first rectifier tube.

A further object of the invention is to provide a power supply for closed circuit television projectors whereby to reduce the size and weight of television projectors.

A still further object of the invention is to provide a power supply capable of amplifying the output of a horizontal output tube to produce 40 kv. for the second anode of a television projector tube.

A yet further object of the invention is to provide power supply which overcomes the disadvantages of the bulky, expensive, dangerous and heavy type of brute-force power supply.

A still further object of the invention is to provide a power supply which overcomes the requirement for a separate high voltage oscillator requiring many tubes and components and its disadvantages of being physically large, bulky and costly to manufacture.

Another object of the invention is to eliminate a separate sweep protection chassis.

Yet another object of the invention is to utilize an autotransformer forming part of the receiver to deliver 40 kv. at 750 microamperes to the second anode of the picture tube.

Yet another object of the invention is the provision of an improved power supply of the above character which is of simple design and construction, economical to manufacture, and highly efficient in the accomplishment of its intended purpose.

The objects, advantages and nature of the invention will be more fully understood from the following description of the preferred embodiment of the invention, shown, by way of example, in the accompanying drawings, in which.

Figure 1:
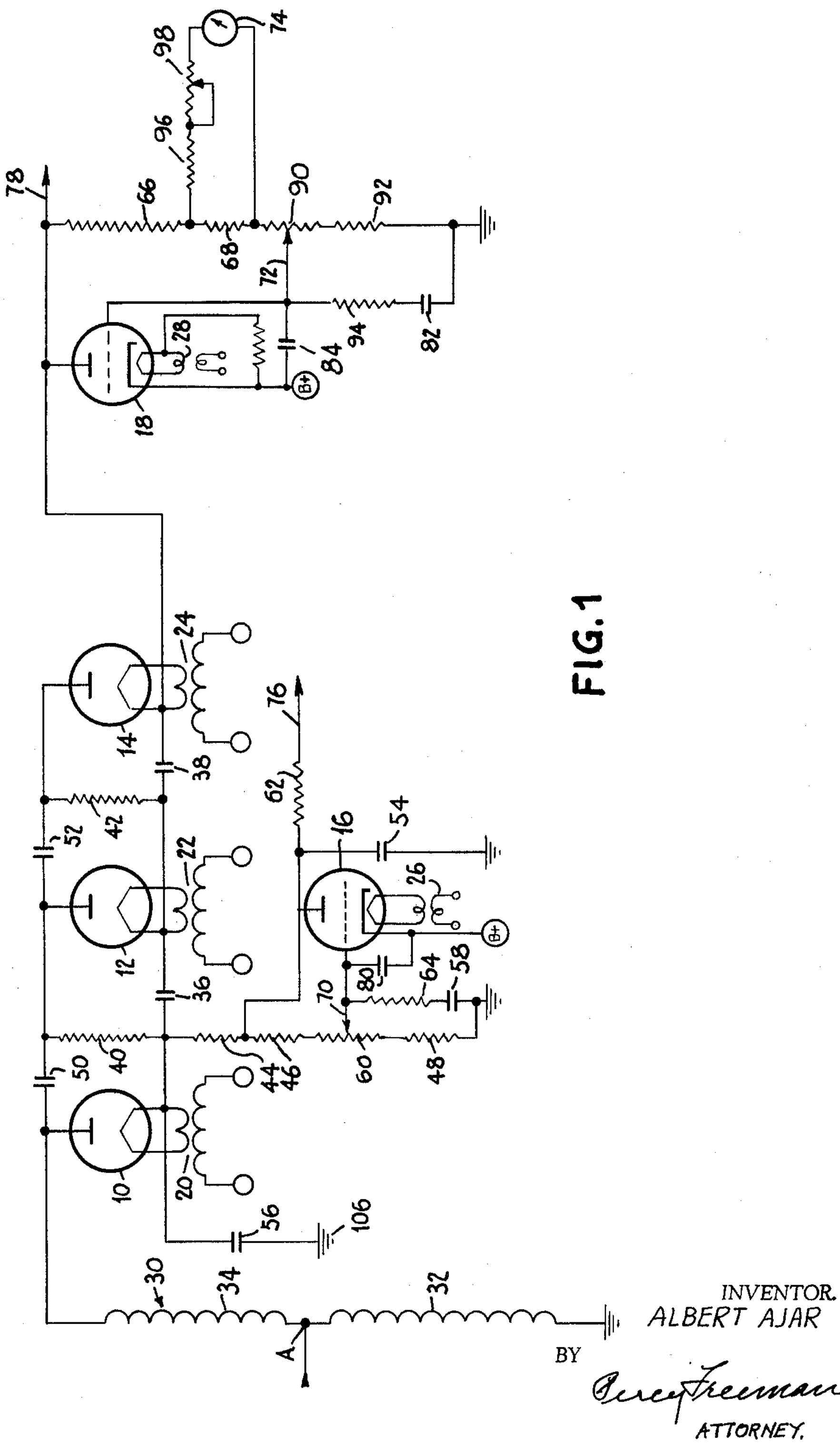
FIG. 1 is a schematic circuit diagram of the power supply according to the invention.

The power supply circuit includes three high voltage rectifier tubes 10, 12 and 14, two regulator tubes 16 and 18. Each of the tubes is provided with its own separate filament transformer, and for this purpose transformers 20, 22, 24, 26 and 28 are provided, as will be explained further hereinafter.

The circuit also includes a flyback or horizontal output transformer 30 which is of the autotransformer type having a primary winding formed from winding 32 and a secondary winding formed from windings 32 and 34. Coupled between windings 32 and 34 at the junction A thereof is the output taken from a conventional horizontal sweep output tube (not shown), such as for example a 6DQ5 tube. The plate of tube 10 has its input connected across the secondary winding of transformer 30 and its output across an R-C combination formed of resistor 40 and condenser 50. The input of tube 12 is connected across an R-C combination formed of the resistor 40 and a condenser 36, and the output of tube 12 is connected across an R-C combination formed of a resistor 42 and a condenser 52. The input to tube 14 is connected across and R-C combination formed of the resistor 42 and a condenser 38.

A condenser 56 is provided connecting the secondary of transformer 20 to ground. As will be explained further hereinafter, a high voltage output of approximately 60 kv. is taken from condenser 38, condensers 56, 36 and 38 combine to triple the 20 kv. input from autotransformer 30.

Connected between the junction of condenser 36 and resistor 40 at one end and ground at the other end is a voltage divider circuit formed of fixed resistors 44, 46, variable resistor 60 and a fixed resistor 48.

Tube 16 forms part of a voltage regulator circuit to provide the 7.5 kv. output at a line 76 coupled to the plate of tube 16 to be applied to the first anode or focus grid of a projection tube (not shown). Tube 16 includes a separate heater element coupled tothe secondary of filament transformer 26. The plate of tube 16 is coupled between the common connection of resistors 44 and 46 and the output by means of the line 76 is taken across an R-C combination formed of condenser 54 and resistor 62. The grid of tube 16 is connected by means of arm 70 to variable resistor 60 in order to obtain the proper bias to produce the 7.5 kv. output; also coupled to arm 70 in parallel wtih resistors 48 and 60 is the series connection of resistor 64 and condenser 58, and filter condenser 80 is connected between the grid and cathode of tube 16. Arm 70 is used to adjust the focus control of tube 16.

Tube 18 forms part of the high voltage regulator circuit to provide the 40 kv. output with the plate connected to the last condenser 38 of the voltage trippler circuit and to the second anode of the projection tube (not shown), by means of line 78 for supplying the 40 kv. output. A voltage divider circuit formed of resistors 66, 68, 90 and 92 is connected between the plate of the tube 18 and ground. The grid of tube 18 is connected by means of arm 72 to resistor 90 to adjust for the 40 kv. output; arm 72 is also connected through the series combination of resistor 94 and condenser 82 in parallel with resistors 90 and 92 in order to provide the proper grid bias. The cathode of tube 18 is connected to the B+ supply and is isolated from the grid by means of filter condenser 84. In order to check the 40 kv. output, a 50 microampere meter 74 arranged to operate as a voltmeter is coupled across resistor 68 to tap off a sample of the voltage across the divider circuit. Fixed resistor 96 and adjustable resistor 98 are coupled in parallel with resistor 68 and in series with the meter 74; resistor 98 is adjustable to adjust the zero position of meter 74.

OPERATION

As mentioned heretofore, a positive pulse is formed in the plate circuit of the horizontal sweep output tube (not shown) during the retrace or flyback period of the sweep cycle. Through autotransformer action of transformer 30, the pulse is stepped up to 20 kv. peak to peak.

Transformer 20 is effective to provide appropriate heat to the cathode of the high voltage rectifier tube 10 and, theerfore, does not load the auto-transformer, thereby assisting in the production of the 20 kv. output. Rectifier tube 10 will conduct during the first positive pulse which occurs during the retrace period and will conduct each time the positive pulse reoccurs. During the first pulse, condenser 56 will conduct and is charged positively with its plate connected to ground being negative and its plate connected to the cathode being positive. During the first interval between pulses, condenser 50 will be charged to 20 kv. as a result of the discharge of condenser 56 through resistor 40.

Upon the occurrence of the second positive pulse, condenser 56 is again charged through tube 10 and condenser 50 discharges through resistor 40 and charges condenser 36 through tube 12, condenser 36 having its negative plate connected with resistor 40 and its positive plate connected to the cathode of tube 12. In a manner similar to the charging of condenser 50, condenser 52 is charged as a result of the discharge of condenser 36 through resistor 42.

When the third positive pulse occurs, condensers 50 and 52 discharge to charge condenser 38 to provide three times the 20 kv. pulse or a 60 kv. output pulse. Tube 14, as a result of the 20 kv. charge on each of condensers 50 and 52 together with the 20 kv. pulse from the autotransformer 30, indicates that the voltage across tube 14 would be 60 kv. However, as a result of certain losses, the voltage which appears across tube 14 and the series combination of 56, 36 and 38 appears to be somewhat less than 50 kv. It is well known that the final output voltage is dependent upon the load and some decrease also occurs during the rectification process.

The regulator tube 18 together with the beam current of the projection tube load the supply down to approximately 40 kv. Regulator tube 16, which is connected to the output of the first rectifier tube 10 insures that 60 kv. never reaches the third rectifier tube 14. It is estimated that voltage regulator circuit for tube 16 absorbs 10 kv. of the theoretical maximum 60 kv. output of the power supply. Also, since the condensers 36, 38, 56, 50 and 52 have the same value, it is fair to assume that the charges on each of the condensers will divide so that the charges on condensers 36, 38, and 56 will be equal to each other and the charges on condensers 50 and 52 will be equal to each other. The problem of suitable insulation of the various tubes and component elements will be described subsequently.

The 50 kv. or less output, but greater than 40 kv. is taken from condenser 38 and tube 14 and applied to voltage regulator tube 18. Arm 72 connected to the grid of tube 18 may be used to vary the grid bias thereof so as to obtain the appropriate 40 kv. output. Meter 74 is used to provide an indication of the regulated output derived from line 78.

The voltage regulator including tube 16 is used to maintain a constant voltage on the focus grid of the projection tube (not shown). The required voltage is obtained from the output of the first rectifier tube 10. The regulator tube 16 is connected across the source with arm 70 being adjustable to adjust the picture focus.

Reference may be made to the following table, from which examples of the tubes and the circuit elements and values thereof may be ascertained. While the following table sets forth certain tubes and values for the circuit elements, this is not intended as a limitation of the invention, but is merely exemplary of one operative circuit.

*Table*

| Circuit components: | Circuit values. |
|---|---|
| Tube **10** | 1B3. |
| Tube **12** | 1B3. |
| Tube **14** | 1B3. |
| Tube **16** | 6BK4. |
| Tube **18** | 6BK4. |
| Transformer **20** | Primary 117 v. A.C. secondary 1.2. volts. |
| Transformer **22** | Primary 117 v. A.C. secondary 1.2 volts. |
| Transformer **24** | Primary 117 v. A.C. secondary 1.2 volts. |
| Transformer **26** | Primary 117 v. A.C. secondary 6.3 volts. |
| Transformer **28** | Primary 117 v. A.C. secondary 6.3 volts. |
| Condenser **26** | 500 micromicrofarads. |
| Condenser **38** | 500 micromicrofarads. |
| Resistor **40** | 5 megohms. |
| Resistor **42** | 5 megohms. |
| Resistor **44** | 10 megohms. |
| Resistor **46** | 4.5 megohms. |
| Resistor **48** | 2.5 megohms—maximum. |
| Condenser **50** | 500 micromicrofarads. |
| Condenser **52** | 500 micromicrofarads. |
| Condenser **54** | 500 micromicrofarads. |
| Condenser **56** | 500 micromicrofarads. |
| Condenser **58** | 0.25 microfarads. |
| Variable resistor **60** | 2.5 megohms. |
| Resistor **62** | 100 kilohms. |
| Resistor **64** | 1 megohm. |
| Resistor **66** | 500 megohms. |
| Resistor **68** | 33 kilohms. |
| Condenser **80** | 0.25 microfarads. |
| Condenser **82** | 0.22 microfarads. |
| Circuit components—Continued | Circuit values. |
| Condenser **84** | 0.47 microfarads. |
| Resistor **90** | 1.5 megohms—maximum. |
| Resistor **92** | 3 megohms. |
| Resistor **94** | 1 megohm. |
| Resistor **96** | 1 kilohm. |
| Resistor **98** | 1 kilohm—maximum. |

Tubes 10, 12 and 14 may suitably be 1B3 tubes, and tubes 16 and 18 may suitably be 6BK4 tubes. Filament transformers 20, 22, and 24 each have a primary winding suitable for connection to a 117 volt alternating current power source and a secondary winding which produces a 1.2 volt output under load. Filament transformers 26 and 28 each have a primary winding suitable for connection to a 117 volt alternating current power source and a secondary winding which produces a 6.3 volts output. Filament transformers to the 1B3 tubes are insulated to at least 40 kilovolts and preferably to 50 kilovolts to prevent breakdown.

The transformers may be prepared by winding the primary winding first so that it is on the inside of the transformer unit and then winding the secondary winding over the primary winding. The manner of winding together with the encapsulation within the epoxy resin mold is effective to insure that the transformers withstand the high voltage of 40 kilovolts. The transformers may be placed separately into an epoxy resin mold or they may be molded together as a unit with the epoxy resin mold base for holding the tubes of the power supply.

The use of the separate filament transformers 20 to 28 is necessary to the proper functioning of the power supply so as to avoid energy being drawn from the flyback system.

The horizontal output transformer 30 is used in its normal conventional manner to supply scanning power in addition to the high voltage pulse of approximately 20 kv. peak to peak to the input to the high voltage rectifier tube. Transformer 30 may be driven, for example, by a 6DQ5 tube, a 475 volt power supply with a total cathode current of approximately 250 milliamperes. The boosted B+ voltage derived is 800 volts. The drive circuit for the transformer 30 is not shown as it forms no part of the present invention. The power supply of the invention, however, receives its 20 kv. pulse during the retrace or flyback period of the horizontal sweep cycle. By means of autotransformer action of transformer 30, this pulse is stepped-up to approximately 20 kv. Junction A of transformer 30 is connected directly with the plate of the 6DQ5 tube (not shown).

CASING FOR POWER SUPPLY

In order to provide proper insulation for the foregoing tubes and circuit elements, a novel casing is provided for the power supply according to another aspect of the invention.

Figure 3:
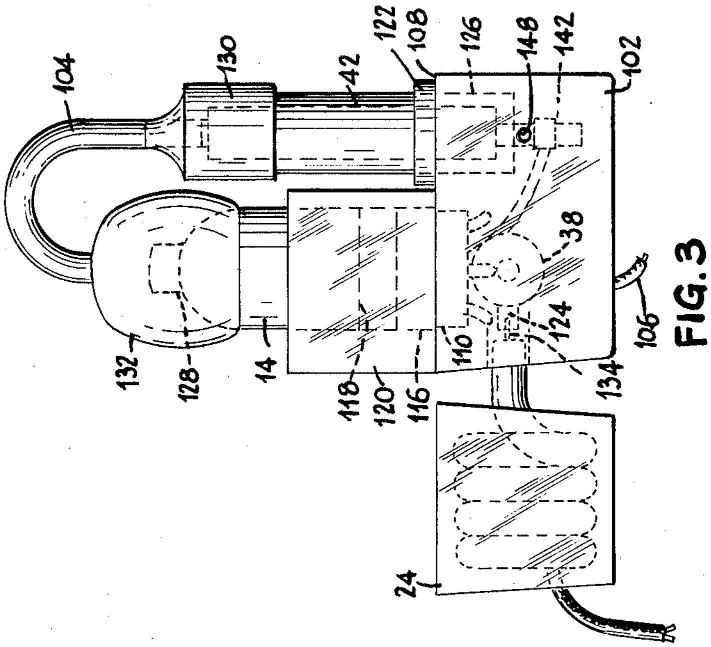
FIG. 3 is an end view of the casing of FIG. 2, as seen in the direction of the arrows 3—3 on FIG. 2.
Figure 2:
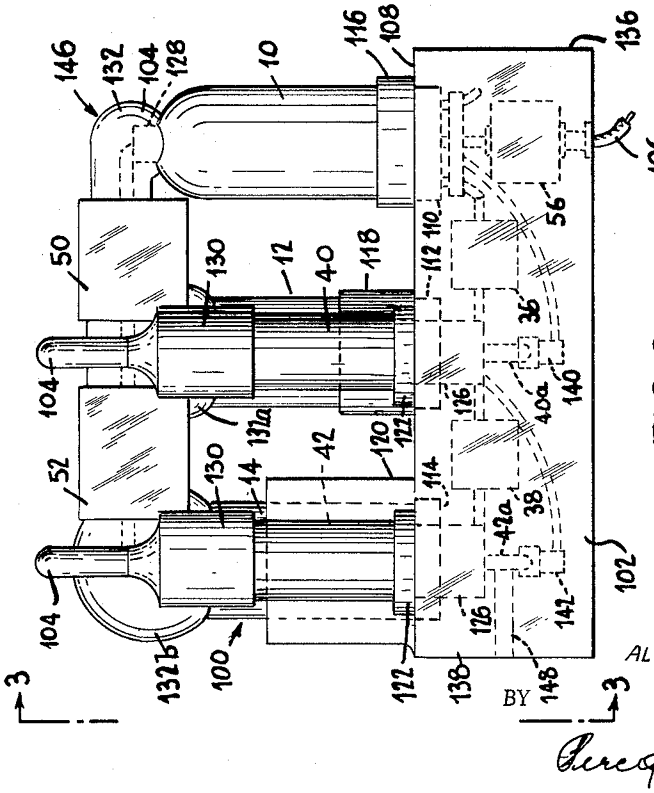
FIG. 2 is a side view of the casing according to the invention, including all the component elements received in the molded base together with the molded rubber parts.

In FIGS. 2 and 3, which illustrate a casing 100 comprising a base 102 formed of a synthetic resin and molded parts 104 formed of silicone rubber to enclose connecting wires similar characters of reference indicate corresponding parts in FIG. 1.

The molded base 102 is provided with suitable recesses formed during the moulding thereof to retain the bases of the three 1B3 tubes 10, 12 and 14 and condensers 36, 38 and 56; the resistors 40 and 42 each have one end thereof, end 40*a*, 42*a* received and molded within the base and its other end 40*b*, 42*b* connected with the cap of the 1B3 tube and insulated by means of the silicon rubber jackets 104.

The base 102 is approximately two and a quarter inches (2¼") in height, three and a half inches (3½") in width and seven and three-eighths inches (7⅜") in length. The dimensions of the base are critical so that the proper spacing is provided in order to prevent arcing and corona conditions and provide the proper insulation for the 40 kv. power supply. The height of the base must be sufficient to receive three octal sockets 110, 112 and 114 for tubes 10, 12 and 14, respectively, in addition to the three condensers 36, 38 and 56. Also contained within the base 102 are two pin jack connectors 140 and 142 arranged to receive the ends 40*a* and 42*a* of the resistors 40 and 42, respectively, and to permit removal in case of failure. A pair of pin jack connectors 124 are provided in the base connected with the octal socket pins arranged to make contact with the cathode of the 1B3 tubes, normally the (2) and (7) pin positions of the octal socket.

Prior to the molding of the base, a form is provided to hold the three octal sockets 110, 112 and 114 in suitable spaced relationship, condensers 36, 38 and 56 are connected to the appropriate pins of the octal sockets, pin jacks 124, 140 and 142 are connected to the appropriate pins of the octal sockets, and a ground connection 106 for condenser 56 is provided. All of the foregoing elements are molded as a unit whereby to maintin their spatial relationship. This mold maintains greater flexibility for troubleshooting and keeps corona and arcing to an absolute minimum. It has been found that no difficulty is encountered with the embedded condensers 36, 38 and 56 or the pin jacks 124, 140, 142. It is also understood that three pairs of pin jacks 124 are provided, one for each of the secondaries of filament transformers 20, 22 and 24, whereby to facilitate connection of the transformers to the cathodes of the voltage rectifier tubes. The plug-in type of connections is suitable for the high voltage requirements. Contact is always insured, and if silicon grease is used, it is well known that suitable contact is always made.

Since different potentials are applied to each of the tubes 10, 12 and 14, an epoxy resin ledge or ring portion to surround the base portion of tubes 10, 12 and 14 is provided. Ledge 116 which surrounds the base of the first tube 10 has a height projection above the top surface 108 of mold 102 of approximately one-half (½″) and a wall thickness of approximately one-quarter inch (¼″). Ledge 118 which surrounds the base of the second tube has a height projection of approximately one inch (1″) and a wall thickness of approximately one-half inch (½″), and ledge 120 which surrounds the base of the last high voltage tube 14 has a height projection of approximately one and three-quarter inches (1¾″) and a wall thickness of approximately three-quarters inch (¾″). A ledge 122 surrounding each resistor socket 126 is also provided and has a height above the base 108 of approximately one-quarter inch (¼″) and a thickness of approximately one-quarter inch (¼″).

It is well known that the anode of the 1B3 tube is taken through the cap 128. In order to provide for the necessary insulation for the connections or connecting elements from the cap 128 to the condensers 50 and 52 and the other ends 40*b*, 42*b* of resistors 40, 42, the molded parts 104 are formed of silicon rubber and provided at the ends with resistor jackets 130 to enclose ends 40*b*, 42*b* and tube jackets 132, 132*a* and 132*b* to enclose the top portion of the 1B3 tubes, thereby enclosing cap 128. The connecting wire connected between the caps 128 and ends 40*b*, 42*b* of the resistors is enclosed within the molded part 104. Molded parts 104 are also used to connect the cap of tube 10 with condenser 50 and condenser 50 with resistor 40. The necessary connecting wires to interconnect the circuit components external of the molded base 102 are enclosed within the molded parts 104 to provide the necessary insulation.

The filament transformers, as exemplified by transformer 24, are each encased in a separate epoxy mold casing, with the secondary winding brought out and terminated in suitable pin connectors 134 for connection with pin jacks 124.

The filament transformers are cast or molded in an epoxy resin mold to withstand 50 kv. As mentioned heretofore, the filament transformers prevent loading of the autotransformer 30.

The height of the power supply unit is approximately six inches (6″) with the topmost portion of the molded parts 104 extending approximately three and three-quarter inches (3¾″) above the top surface 108 of the base 102. To insure that there is no arcing at the edge of the top surface 108 near tube 10, the outside edge of the ledge 116 is spaced inwardly approximately three-eighths of an inch (⅜″) from the side 136 of the base. The ledge 120 is effective to take care of any arcing towards side 138 so that it is sufficient to have ledge 120 merge smoothly subject to molding techniques with the top surface 108 and side 138. The spacing between adjacent 1B3 tubes preferably should be approximately one inch (1″). The input from transformer winding 30 is applied to tube 10 at 146 and the output of the power supply is taken from a connection 148 provided in the molded base.

The ledges 116, 118 and 120 are important features of the molded base 102. The ledge 116 for the tube 10 is preferably at least one-quarter inch (¼″) above surface 108, and the ledge 120 covers at least half the height of tube 14. It will, therefore, be apparent that tube 14 has its outside portion substantially entirely covered and insulated.

It has been found that the casing provides suitable insulation above 50 kv. In order to increase the insulation potential to 60 kv or more, it is necessary to increase the spacing between the tubes 10, 12 and 14, thereby increasing the length of the base. Further increase may also be effected by raising the minimum height of the ledges 116, 118 and 120 or the height of the base.

The small physical size for the power supply unit is achieved through the use of the molded base 102 formed from the epoxy resin and the silicone rubber for the molded parts 104.

While condensers 36, 38 and 56 are shown encased in the base 102, it is within the scope of this invention to provide condenser sockets for these condensers and suitable pin and pin jack connectors, thereby having the base wiring for the cathodes of the tubes 10, 12 and 14 encased and permitting replacement of the condensers, if necessary.

While I prefer to use the synthetic resin for the base and the silicone rubber for the molded parts, I have tried other insulating materials such as Bakelite, polyethylene, polystyrene, varnish, natural resins, oils, waxes and like insulating materials and have not found these to be particularly well suited for the casing for the power supply.

It is to be understood that the power supply of this invention is somewhat similar to the power supply for an ordinary television receiver. However, the power supply of the present invention is capable of producing the 40 kv. output with the load and regulation. With no load and regulation, a 60 kv. output is obtainable.

While there has been described what is at present considered to be the preferred embodiments of this invention, it will be obvious to those skilled in the art that various changes and modifications may be made therein without departing from the scope of the invention.

What I claim is:

1. In a high voltage power supply casing adapted to hold three high voltage recifier tubes and associated condensers and resistors, the improvement comprising a molded base form of an epoxy resin encasing the condensers, said base having molded therein an octal socket for each said tube and a resistor socket for each said resistor, a ledge for each said socket molded together with said base formed thereon surrounding each said octal socket, one of said ledges projecting approximately ½″ above the top surface of said base and having a wall thickness of approximately ¼″, a second one of said ledges projecting approximately 1″ above said top surface of said base and having a wall thickness of approximately ½", and a third one of said ledges projecting 1¾" above the top surface of said base and having a wall thickness of ¾".

2. In a power supply according to claim 1, a ledge for each said resistor socket molded together with said base formed thereon surrounding each said resistor socket, said ledge having a height and a thickness approximately ¼".

3. In a power supply providing a 40 kv. output, adapted to carry three high voltage rectifier tubes, said power supply having a 20 kv. input peak-to-peak with said rectifier tubes forming a voltage trippler circuit, three condensers each having one connection with the cathode of one of said high voltage rectifier tubes, one of said condensers having one end adapted to be connected to ground and another of said condensers having one end adapted to provide said 40 kv. output, two further condensers each connected between the anodes of said tubes and a pair of resistors each connected between the cathode of one of said tubes and the anode of another of said tubes, the improvement comprising a molded base formed of an epoxy resin and having molded therein an octal socket for each said tube to carry said tubes in spaced insulating relationship, whereby to permit 40 kv. output without insulation failure, a ledge formed of the epoxy resin surrounding each said octal socket, one of said ledges having a height of approximately ½" and a thickness of approximately ¼", a second of the ledges having a height of approximately 1" and a thickness of approximately ½", and the third of said ledges having a height of approximately 1¾" and a thickness of approximately ¾".

4. In a power supply as claimed in claim 3, wherein the one ledge is spaced approximately ⅜" from an edge of said base.

5. In a power supply as claimed in claim 4, including molded silicone rubber connectors insulating the electrical connection of the resistors and said tubes external of said base.

6. In a power supply as claimed in claim 5, including a ground connection connected to one of said three condensers and extending externally of said base.

7. The use of an epoxy resin base as an insulator for a voltage trippler circuit, adapted to provide a 40 kv. output, said trippler circuit comprising first, second and third voltage rectifier tubes, a first condenser connected between a source of reference potential and the cathode of said first tube, a first resistor-condenser combination connected between the cathode and an anode of said first tube, a second condenser coupling the cathodes of said first and second tubes, a second resistor-condenser combination connected between the cathode and anode of said second tube, a third condenser coupling the cathodes of said second and third tubes, an output means coupled to said third condenser providing the 40 kv.

output, said base comprising first, second and third octal sockets embedded therein adapted to receive said first, second and third tubes, said first, second and third condensers being embedded in said molded base and connected with said octal sockets, first and second pin jack connectors embedded in said base adapted to receive a pin connector element on each said first and second resistor-condenser combinations, a ground connection extending externally of said base connected to said first condenser, an output connection extending externally of said base connected to said third condenser, and ledge portions for each said octal socket positioned on a surface of said base through which said sockets open.

8. A casing for a high voltage power supply capable of producing a 40 kv. output, said power supply comprising three voltage rectifier tubes, three condensers each coupled to at least one cathode of the tubes, two resistor-condenser combinations each coupled between the anode and cathode of one of the tubes, one of said three condensers being adapted for coupling to a source of reference potential and another of said three condensers adapted for coupling to an output circuit to provide the 40 kv. output, said casing comprising a molded epoxy resin base and a molded silicone rubber insulating connector, said base having molded therein as a unit therewith three octal sockets, one for each said tubes, said unit including said three condensers, a ground connection for connection with the source of reference potential, an output connection for connection to the output circuit, a pair of pin jack connectors adapted to receive pin connectors connected to the two resistor-condenser combinations, said connector enclosing the top portion of said tubes and a portion of the resistors of said resistor-condenser combinations, said base and said connector being effective to insulate the power supply 40 kv. whereby to prevent arcing between the components and tubes.

References Cited by the Examiner

UNITED STATES PATENTS

| | | | |
|---|---|---|---|
| 2,499,484 | 3/1950 | Friend | 321—15 |
| 2,753,509 | 7/1956 | Merriam | 321—18 |
| 2,783,433 | 2/1957 | Baker | 321—18 X |
| 2,829,320 | 4/1958 | Dimond. | |
| 2,894,196 | 7/1959 | Bernbaum | 321—18 |
| 2,957,119 | 10/1960 | Carlson | 321—18 |
| 2,985,812 | 5/1961 | Peterson | 321—15 |
| 3,030,553 | 4/1962 | Comuntzis | 317—100 |
| 3,035,210 | 5/1962 | Setchell | 317—101 |

OTHER REFERENCES

Electronics, October 1956, pages 189–190.

Radio and Television News, February 1957, page 116.

ORIS L. RADER, *Primary Examiner.*

J. J. SWARTZ, W. SHOOP, *Assistant Examiners.*